INVENTOR.
E. Peter Schellens
BY
ATTORNEY

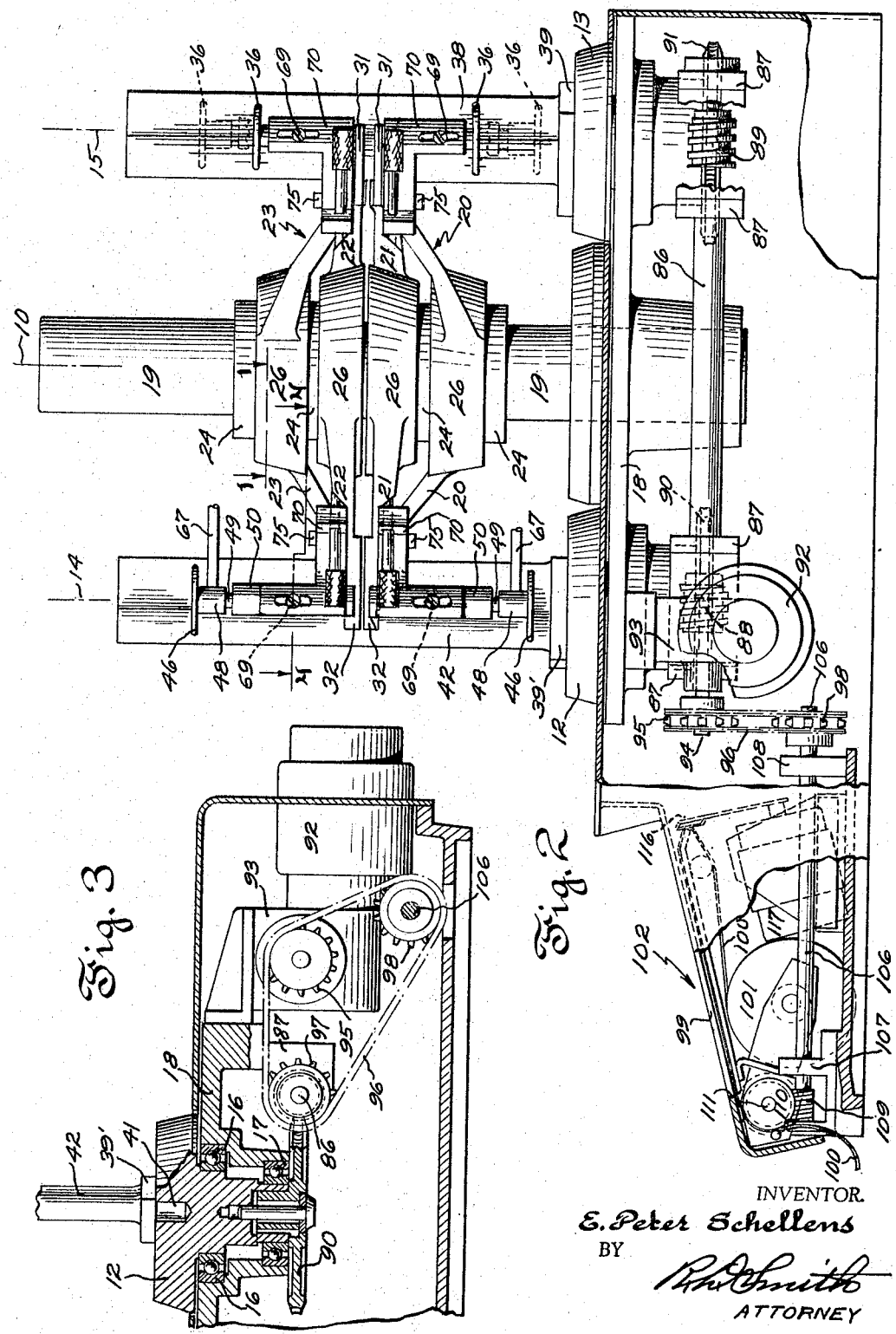

May 9, 1967  E. P. SCHELLENS  3,318,008
METHOD AND APPARATUS FOR REGISTERING OR RECORDING
THE ACCURACY OF REPRODUCED CONTOURS
Filed Aug. 28, 1964  5 Sheets-Sheet 3
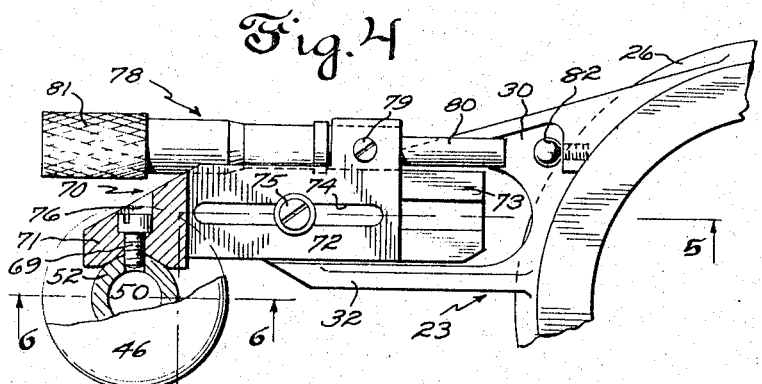
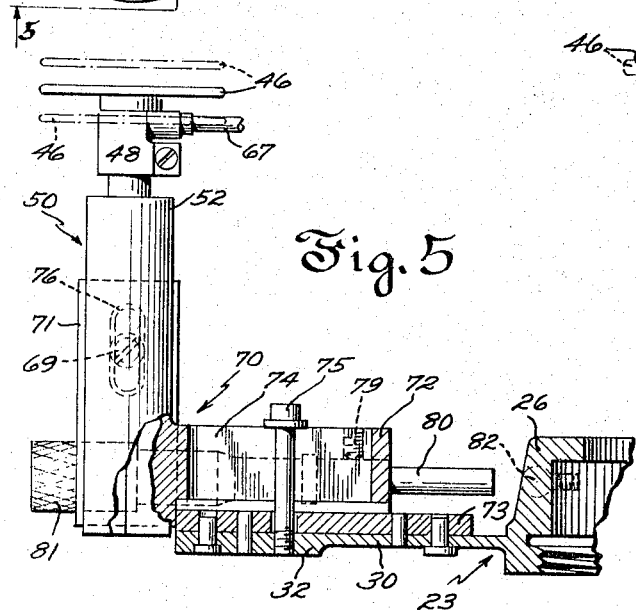
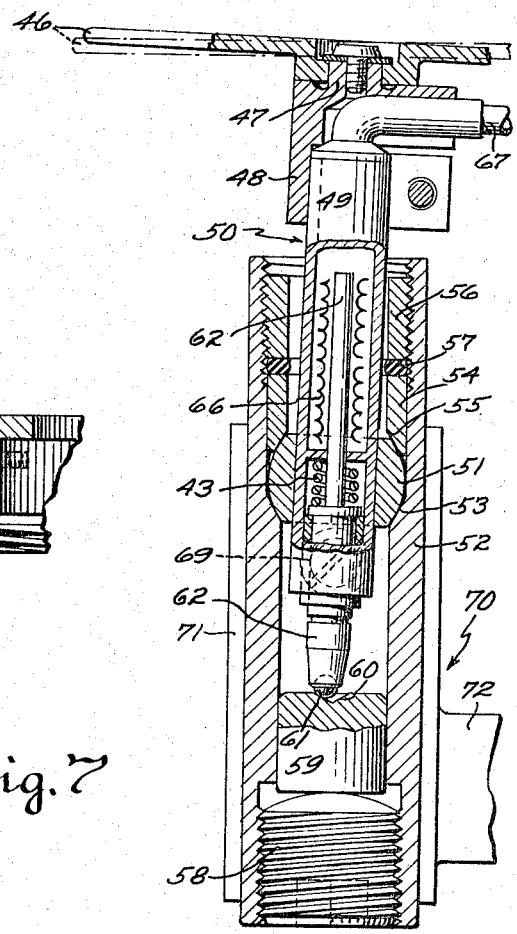
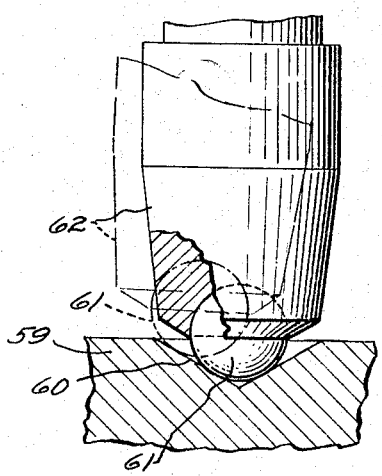
INVENTOR.
E. Peter Schellens
BY
ATTORNEY May 9, 1967 E. P. SCHELLENS 3,318,008
METHOD AND APPARATUS FOR REGISTERING OR RECORDING
Filed Aug. 28, 1964 THE ACCURACY OF REPRODUCED CONTOURS
5 Sheets-Sheet 4
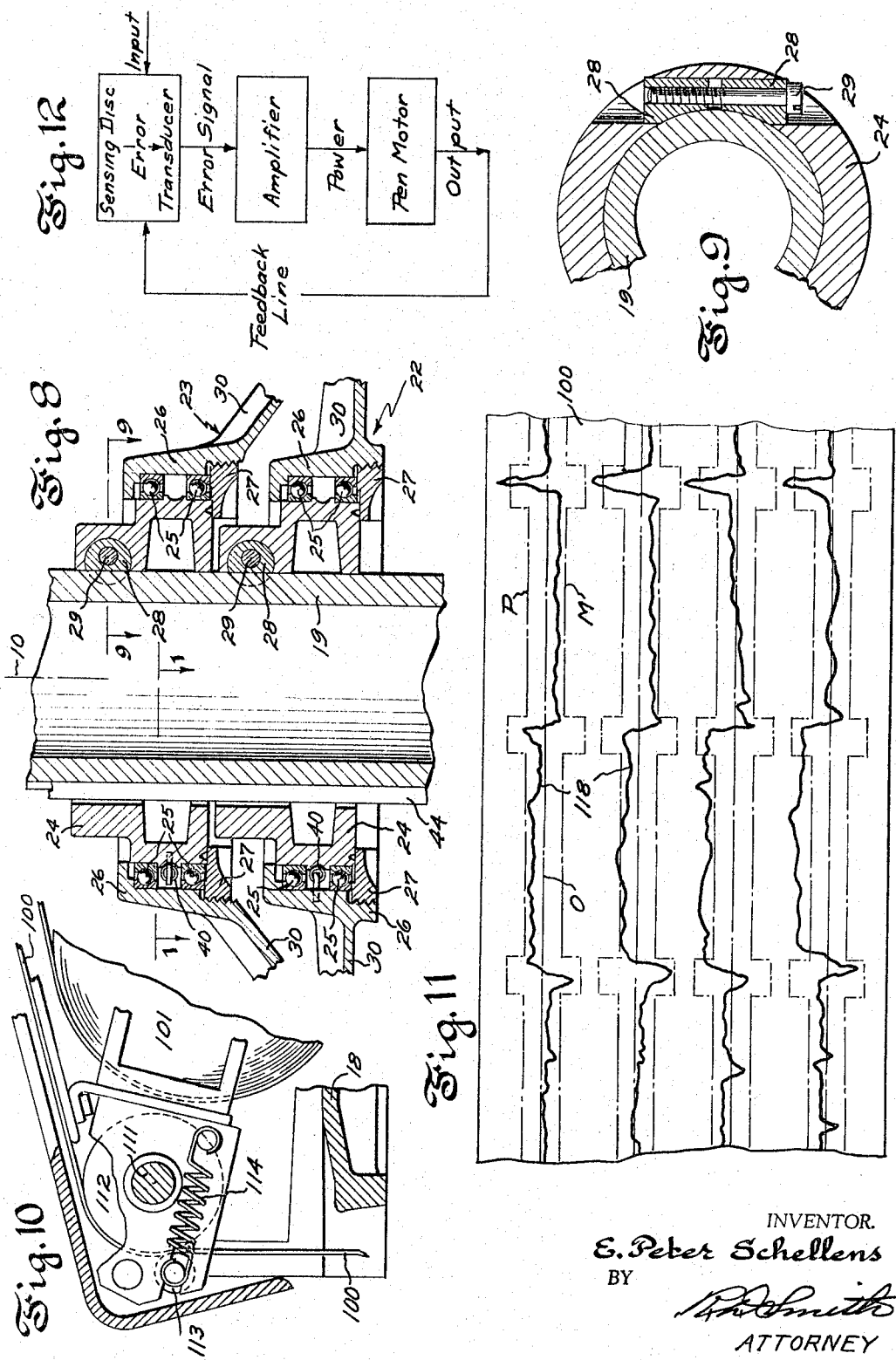
INVENTOR.
E. Peter Schellens
BY
ATTORNEY

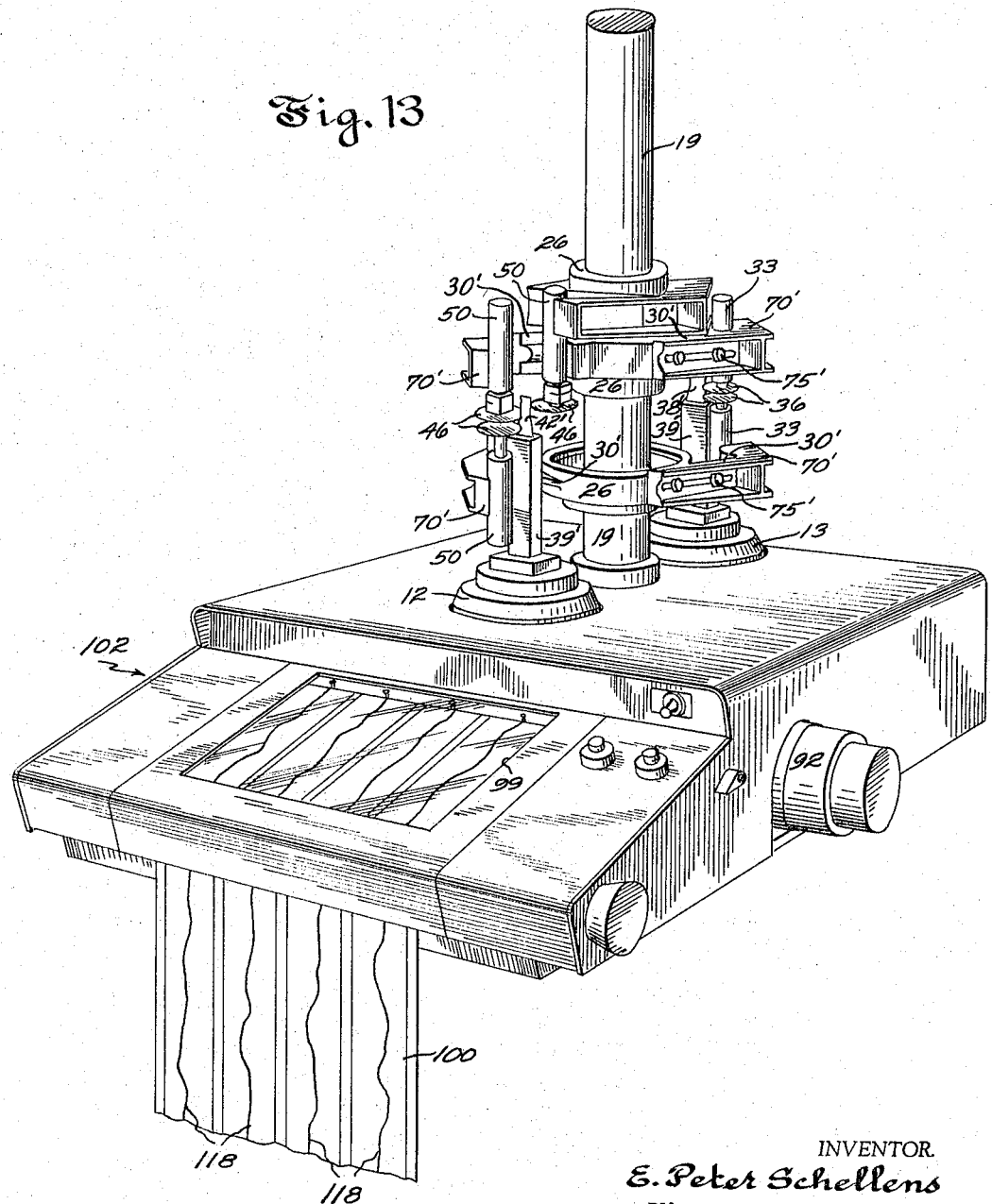

United States Patent Office 3,318,008
Patented May 9, 1967

3,318,008
METHOD AND APPARATUS FOR REGISTERING OR RECORDING THE ACCURACY OF REPRODUCED CONTOURS
Eugene Peter Schellens, Essex, Conn., assignor to Schellens True Corporation, Essex, Conn., a corporation of Indiana
Filed Aug. 28, 1964, Ser. No. 392,789
13 Claims. (Cl. 33—174)

This invention relates to the art of and apparatus for detecting and registering or recording the extent and location of variance between the surface contour of a solid work article, regarded as a production specimen whose shape is to be tested, and a pattern configuration or master article to whose shape the contour of the surface of the specimen is intended to conform.

In practicing the present improvements the specimen article whose contour is to be tested may be a production piece such as a turbine blade having an airfoil surface possessing the shape characteristics of contour, lean, bow, twist and centrality, all of which are to be compared with corresponding master or pattern configurations.

In one way of practicing the invention the specimen will be compared, for detection of error, with a configuration which may be the outline shape of a proportionally larger template or master pattern. In other ways of practicing the invention the surface contour of the specimen will be compared, for detection of error, with the corresponding surface contour of a solid pattern body having the size and shape to which the specimen is to be compared.

One object of the present improvements is to produce a complete dimensional analysis of multiple profile sections of a turbine or compressor blade simultaneously with respect to those of its contours that produce its foil surface, chordal width, edge contours, lean, bow and twist at any selected distance or distances from the root or mounted end of the blade and preferably to present such analysis in chart form as a permanently readable and reproduceable record.

Another object is to accomplish such analysis by comparison of the contours of the blade, regarded as a specimen, with the configuration of a pattern curve of much larger size, or with a master blade of substantially the same size, in a manner in either case to register and also to chart in permanent record form the exact extent and location of differences between the specimen blade and the master blade due to errors in the specimen blade.

A further object is to record simultaneously on a single strip chart a plurality of specimen testing results as for instance the extent or location of errors occurring in the contours of opposite air foil surfaces of a single specimen blade at respectively differing distances from its root or mounting end.

Another object is to make a record of the test results on a single strip chart in the form of a separate graph in each of plural channels extending lengthwise of the chart paper, each of which graphs exhibits minute deviations in a specimen being tested from the configuration of corresponding portions of a pattern outline with which the specimen is being compared. Or each graph, if desired, may record a complete cycle of scanning of the blade fully around its sectional periphery.

Another object is ot read the said graphs by visually relating the same respectively to previously prepared graphs representing an errorless specimen and having marked thereon limiting zones of error that must not be escaped by the test graph if the specimen is to pass inspection.

Another object is to generate a test graph in which the peaks thereof above or below a neutral line "0" shall be occasioned not in proportion to actual dimensions of the specimen being tested but only in proportion to the extent of failure of the specimen to conform to a master configuration.

The foregoing and other objects of the present improvements will become clear in greater particular from the following description of ways and means of practicing the invention in which description reference is had to the appended drawings wherein:

FIG. 2 is an elevational view of the apparatus of FIG. 1 with a side wall of its base compartment broken away to expose mechanism for driving the rotary tables and the recorder in synchronism.

FIG. 3 is a fragmentary view taken partly in section on the planes 3—3 in FIG. 1.

FIG. 4 is an enlarged fragmentary plan view taken partially in section on the plane 4—4 in FIG. 2.

FIG. 5 is a view in elevation of the parts in FIG. 4 taken partially in section on the planes 5—5 in FIG. 4 looking in the direction of the arrows.

FIG. 6 is a view in section on the plane 6—6 in FIG. 4 looking in the direction of the arrows showing the specimen sensing and transducer unit.

FIG. 7 shows enlarged the ball tip of the transducer and its cooperative conical seat for effecting axial movement of the transducer core when the transducer is tilted.

FIG. 8 is an enlarged view of the tracing lever hubs shown in section on the plane 8—8 in FIG. 1 looking in the direction of the arrows.

FIG. 9 is a fragmentary view in section on the plane 9—9 in FIG. 8.

FIG. 10 is an enlarged detail of parts that feed the chart strip viewed in section on the plane 10—10 in FIG. 1.

FIG. 11 shows details of typical markings recorded on the chart strip.

FIG. 12 is a diagram of the electrical servo system that operatively relates the chart recording pens to the specimen sensing apparatus.

FIG. 13 is a perspective view of the exterior of the complete apparatus of FIGS. 1 and 2 showing minor modification of details of certain mechanical parts.

Figure 1:
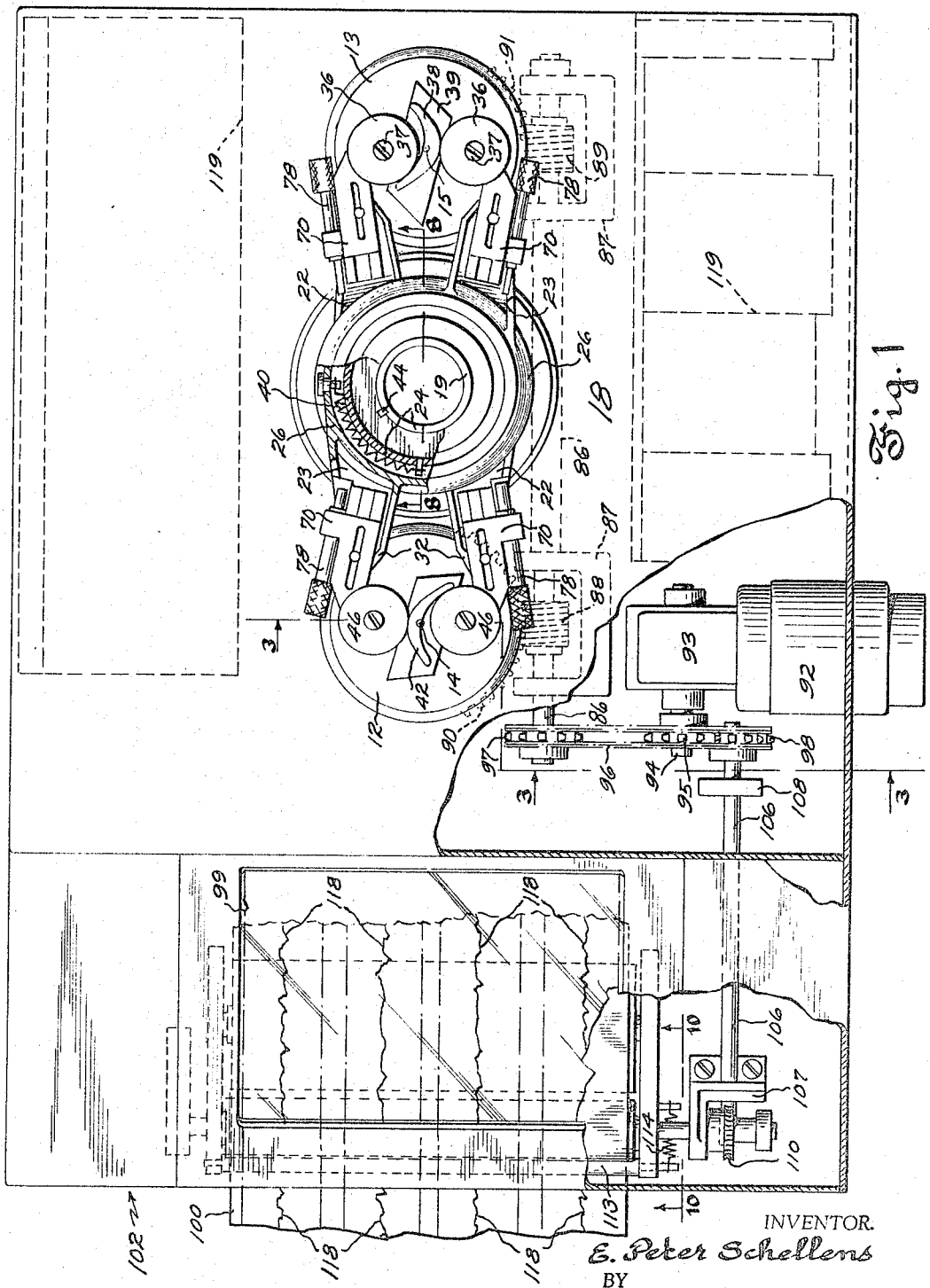
FIG. 1 is a plan view of a comparator and recorder apparatus embodying the invention showing its casing wall partly broken away to expose internal parts, other parts appearing in section on the plane 1—1 in each of FIGS. 2 and 8.

There will first be described an apparatus which can be employed as an aid in practicing the method of these improvements although the novel principles of the method may be practised without use of the disclosed apparatus.

In the particular apparatus herein disclosed to illustrate the invention there are two rotary tables 12 and 13 whose vertical axes of rotation 14 and 15 are parallel and spaced apart, each table being journaled and supported in anti-friction ball bearings 16 and 17 lodged in a common frame structure 18. Mechanism is shown in FIGS. 1 and 2 whereby both tables 12 and 13 are rotated at identically the same angular speed as later herein referred to. See also FIG. 3.

Supported to be rigid in frame structure 18 between the rotary tables is a stationary vertical post 19 providing rotary support for one or more tracing levers such as 20, 21, 22, and 23 herein sometimes referred to as carriers and which are free to oscillate independently in horizontal planes at respectively different levels about the post 19. These tracing levers as shown in FIG. 8 are supported at their different levels by separate bearing rings of which examples are shown in FIG. 9. Each bearing ring 24 is interlocked against turning relatively to post 19 by a spline 44 and engages, at its periphery, anti-friction bearing balls 25 surrounded by the hub 26 of a tracing lever and removably held in said hub. Each bearing ring 24 has a hole tangential to post 19 and containing a two-piece gib or wedge 28 that can be tightened and released by a clamp screw 29 thus to fasten the bearing rings 24 independently to the post 19 in fixed vertical stations of selective spacing.

As the tracing levers and their supporting bearing rings are alike except for the differing inclination of their arm portions 30 and except for the right or left handedness of their terminal portions or lever heads 31 and 32, it will suffice to describe one tracing lever and its equipment in detail.

One head portion 31 of each tracing lever carries a circular follower disc 36 that is freely rotatable about its pivot pin supported adjustably on the lever head by means of upright staffs 33 as shown in FIG. 13. The periphery of follower disc 36 of each tracing lever is kept continually in tangential coincidence with a pattern curve by means of a spring 40 that biases the tracing lever 23 to swing counterclockwise in FIG. 1, or biases tracing lever 22 to swing clockwise in FIG. 1, by being stretched in an arc between the hub 26 of the tracing lever and the stationary post 19. Such pattern curve is herein represented in FIG. 1 as the airfoil surface of a turbine or compressor blade 38 serving as a master patern and which like a specimen 42 to be tested has a mounting base 39 fixedly oriented on a rotary table, as 12 or 13, by a base stud 41 so as to upstand rigidly therefrom as shown in FIG. 3. FIGS. 1 and 13 show that two such follower discs on respectively different tracing levers can be in contact simultaneously with differently curving pattern surfaces of the same blade such as the convex and concave contours of the pattern blade 38.

The opposite head 32 of each tracing lever carries a specimen sensing feeler disc 46 freely rotatable about a bearing boss 47 that projects from a split terminal bracket 48 that hugs and is fixedly clamped to the outboard end of the tubular casing 49 of a linear position transducer 50. Casing 49 is tiltably supported on the head 32 of the tracing lever in a manner best shown in FIG. 6. The specimen to be sensed by disc 46 is represented in FIGS. 1 and 13 as a turbine or compressor blade 42 or 42' taken from a production run to be tested and except for errors to be detected is like the pattern blade 35 or 35' and likewise has a mounting base 39 or 39' fixedly oriented on rotary table 12 as aforesaid in the same relation to axis 14 of table rotation as is pattern blade 38 or 38' to the axis 15 of table 13.

Fixed on the outer surface of transducer casing 49 there is a ball collar 51 whose external surface is spherically contoured and very smoothly finished. Collar 51 is mounted to rock or tilt freely within a hollow cylindrical post 52 that houses the transducer and whose internal surface presents a beveled shoulder at 53 affording one side of a bearing socket in which the ball collar 51 is pivotally seated. The opposite side of the bearing socket is formed by a liner bushing 54 which fits slidably within post 52 and whose end nearest to the post shoulder is beveled at 55 in the same manner as shoulder 53. The spacing between bushing 54 and post shoulder 53 is maintained adjustably by a tubular screw plug 56 having threaded engagement with the end portion of post 52 and capable of applying resilient pressure axially on the slidable liner bushing 54 through the squeezable O-ring 57.

The opposite or bottom end of the hollow post 52 is closed by a screw plug 58 against which is seated a normally stationary cylindrical abutment block 59 slidably fitting the hollow of post 52 so as to be positioned axially therein by plug 58 which provides a positive axial thrust abutment for the block 59. Block 59 contains a conical recess 60 in which there is movably nested a roller ball tip 61 carried at the external end of the axially reciprocative core 62 of the linear position transducer 50. Thus when the transducer casing 49 rocks or tilts about its pivotal bearing 51, 53, 55 ball tip 61 swings in an arc about said bearing and encounters the sloping sides of the conical recess 60. This causes axial movement of the transducer core 62 within the transducer casing 49. The field windings 66 of the transducer, in which electrical potential is fluctuated by such axial movement of core 62, terminate in very flexible insulated conductor leads 67 which are given outlet laterally through the terminal bracket 48 shown in FIGS. 5 and 6. The transducer casing is impelled to tilt when the specimen sensing feeler disc 46 is deflected laterally of post 52. Further particulars of the transducer 50 and its electrical functioning are explained hereinafter in connection with a graph generating recording instrument incorporated within the overall apparatus of these improvements.

The transducer housing post 52 is adjustably positioned on a mounting bracket 70 of angular shape having an upright channeled branch 71 and a horizontal base branch 72. The former has a vertically elongated slot 76 through which a clamp screw 69 extends into threaded engagement with a tapped hole in the transducer post 52 for releasably holding said post fixedly in selective vertical positions on bracket 70. The base branch 72 is slidably adjustable along guideways 73 formed on the lever head 32 and contains a horizontally elongated slot 74 through which a clamp bolt 75 extends into threaded engagement with a tapped hole in lever head 32 for releasably holding the bracket 70 fixedly on the lever head at selected radial distances from the vertical axis 10 of post 19.

To assist in finely measuring needed alterations of such radial distances the base branch 72 of the mounting bracket 70 is equipped with a linear micrometer 78 whose casing shank is fastened fixedly in a lateral extension of bracket branch 72 by means of a set screw 79. The sensing end 80 of the micrometer is extendable to the right in FIGS. 4 and 5 by turning the usual knurled screw threaded ferrule 81. To serve as a durable contact abutment to be met by the sensing end 80 of the micrometer the hardened head of a screw stud 82 is lodged in the hub 26 of the tracing lever so that extents of adjustive movement of the transducer 30 relatively to the tracing lever can be measured with accuracy.

In the overall functioning of the parts of the apparatus hereinbefore described there is needed a means to rotate the two tables 12 and 13 simultaneously at the same angular speed. For this purpose there is shown in FIGS. 1 and 2 a worm shaft 86 journaled in frame supported bearings 87. Two worms 88 and 89 alike are fixed on shaft 86 and are in mesh respectively with worm wheels 90, 91 united respectively with rotary tables 12 and 13. Shaft 86 is powered to rotate by a motor 92 through conventional speed reduction gear in casing 93 having an output shaft 94 carrying a sprocket wheel 95. Through a positive drive belt or chain 96 sprocket wheel 95 rotates a sprocket wheel 97 fixed on the outboard end of worm shaft 86. The same chain 96 is drivingly trained about an auxiliary sprocket wheel 98 for rotating the paper strip feed roll of a recording instrument 102 shown in FIGS. 1 and 2 as housed by an extension of the hollow frame structure 18 having the window opening 99.

While many kinds of conventional recorders will serve some of the purposes of this invention there is preferred a multipen, strip chart type of recording unit wherein there is a single chart drive and plural separate marking pens motivated to generate separate graphs side by side on the same strip chart as typified in FIG. 11. The marking pens 116 are driven by separate pen motors 117 that are energized respectively through separate electrical servo systems like that diagrammed in FIG. 12 which will include the field windings 66 of the linear transducer 50 on the heads 32 of the tracing levers as hereinbefore described. The servo systems may be conventional and of the closed loop type incorporating a feed back line and a pen motor related thereto as indicated in FIG. 12. The rectangles 117 shown in broken lines in FIG. 1 represent the location of suitable electrical components such as amplifiers and relay switches that may be incorporated in the diagram of FIG. 12.

The strip chart 100 is represented in FIGS. 1 and 2 as caused to be fed from its storage drum 101 simultaneously and in synchronism with rotation of tables 13 and 14 by motor 92 through the aforesaid sprocket wheel 98. The recorder shaft 106 carrying sprocket wheel 98 is journaled in frame work bearings 107, 108 and carries a worm 109 that drives worm wheel 110 on the transverse shaft 111 of the strip chart feeding roller 112.

For comparison with four graphs resulting from markings of the pens 116 in four parallel channels on the same strip of chart paper, FIG. 11 shows in the center of each channel a pre-marked null line "0" flanked on opposite sides by zone limit lines P and M. The zone bordered by lines P and M embraces maximum permissible departure of a test curve from the "0" line in either direction that would enable a specimen to come within tolerance specifications. The zone limit lines P may represent maximum permissible oversize error in the specimen and the limit lines M maximum permissible undersize error.

As an example, in the graph shown in FIG. 11 each zone limit line P or M shows the distance from null line "0" that represents .001" of error. A test graph that was without error would coincide with the straight null line "0." Thus a graph line that fails to so coincide records departures from standard in thousandths of an inch. For visual comparison, the zone limit lines P and M may be laid out on a transparent plastic overlay which can be superimposed over the test graph. By photographing the combination of chart graph and transparent overlay a composite of the test graph and zone limit lines can be reproduced as a single marking. As an alternative the graph paper may be premarked with the null line "0" and the zone limit lines P, M and then subjected to the marking of the graph generating pens for visual comparison thereof on the same surface of the paper strip chart.

In use of the above described apparatus as an aid in performing the steps of the improved method, it will be kept in mind that the errors that are to be measured are equal to differences in the distance from the axes of rotation of the tables 12 and 13 to particular loci in the contour of a pattern and of a specimen workpiece respectively. This is true whether or not the tables are rotating. Hence the measuring steps of the improved method can be carried out whether or not there is continual rotation, intermittent rotation, or no rotation of the tables.

One step of the improved method comprises swinging a pattern curve such as the peripheral surface of a master article 38 about a reference axis such as 15 to a designed rotary position. Another step comprises moving two followers such as 36 toward or away from an axis 15 of pattern rotation to a distance that brings the followers into coincidence with different uniplanar components of the pattern curve 38. Another step is to swing a specimen article 42 about a different axis such as 14 to a corresponding rotary position. Another step is to move a specimen sensing feeler such as 46 toward or away from the axis 14 a distance that brings the sensing feeler into contact with different uniplanar components of the surface of the test specimen, and the next step is simultaneously to measure and make a unified record of the difference between the resulting proximity of the followers to axis 15 and the proximity of the sensing feelers to axis 14 which will show all discrepancies of contour between specimen and pattern in a single profile plane.

While the stated steps of measuring the difference between the said proximities can be carried out in a variety of ways, as for intsance by stepping them off on a graduated scale by use of ordinary machinists' dividers, such measuring is carried out herein by use of the apparatus that has been described and in the following manner.

Recalling that in its oscillative movement, the tracing lever maintains a distance between the center of the transducer pivot 51 and the axis of rotation 14 of specimen table 12 which distance bears constant relation to the distance between pivot 37 of follower disc 36 and the axis of rotation 15 of pattern table 13, it will be seen that if the specimen sensing disc 46 and the pattern follower disc 36 were of the same diameter and the follower disc contacts the pattern curve, and the specimen being tested is undersize at the locus in its contour that is being sensed by disc 46, there would occur a gap between the sensing disc 46 and the surface of the undersize workpiece. To enable the undersize specimen to be contacted at all times by the sensing disc 46 the latter is preferably made larger in diameter than the follower disc. If it is desired to measure only errors that are not in excess of .020" the sensing disc can have a diameter .040" larger than that of the follower disc. Then when the sensing disc contacts a locus on the specimen where the latter is undersize to the above mentioned maximum extent of .020" the transducer casing 49 should be so mounted that its axis assumes coincidence with the vertical axis of the hollow post 52 as long as disc 46 is undisturbed by extraneous forces. This true vertical position results from the automatic thrusting of the ball tip 61 outward from the transducer casing 49 caused by the core loading compression spring 43 in the transducer. This ball tip 61 automatically tends to nest in its lowest seating position in the conical cavity 60. The ball tip is shown thus seated by full lines in FIG. 7.

If now, the rotary movements of the specimen and the pattern cause feeler disc 46 to encounter a locus on the surface of a specimen 42 that is .020" oversize, the feeler disc will be forced from its full line position to its broken line position in FIG. 7, shown in full lines in FIG. 7, the ball tip 61 being forced to climb the sloping side of the conical recess. This shoves the core 62 upward and inward of the transducer casing 49 to its designed maximum extent. Adjustments will further be such that when disc 46 is sensing a specimen that is an exact duplicate of the pattern, the ball tip 61 will be in a neutral position (not shown) which is half way between its full line and broken line positions in FIG. 7. With such adjustment a sensed locus on an undersize specimen will permit tilting of the transducer casing 49 counterclockwise from such neutral position, while a sensed locus on an oversize specimen will tilt the transducer casing clockwise in FIG. 6 thus causing corresponding axial movements of the transducer core to take place inward and outward of casing 49. By the same token, if the specimen work piece being sensed is an exact duplicate, or a perfectly proportioned copy, of the pattern contour the transducer casing will assume its neutral or half-way position aforesaid.

Referring again to a graph line 18 on the chart strip 100, the servo system diagrammed in FIG. 12 will be so electrically tuned that in the neutral position of the transducer core the pen or stylus 116 of the recorder will be positioned on the aforesaid null line "0" of the chart when transducer casing 59 is in its aforesaid neutral or half-way tilted position or condition. Divergence of the graph line 118 from null line "0" toward the zone limit line P will be caused by sensing a locus on an oversize specimen and likewise divergence of the graph line from null line "0" in the opposite direction, or toward the zone limit line M, will be caused by sensing a locus on an undersize specimen.

If the tables 12 and 13 be rotated synchronously with each other and with the feed roll of the chart strip, either continually or intermittently, the continuous graph line 118 will be generated on the chart and thus record in permanent reproduceable form the extent and location of all variances in configuration between the contour of the specimen and the outline of the pattern.

The complete apparatus as shown in FIG. 13 bears reference numerals as in FIGS. 1 and 2 except for parts having minor modifications of structure which are designated by corresponding reference numerals primed. Instances of such parts are the arm portions 30' of the tracing levers and the brackets 70' mounted respectively thereon for adjustment to selective extents radially of the axis of oscillation 10 of the tracing levers. Also the follower discs 36 and the sensing discs 46 are arranged at various height levels different from those shown in FIG. 2 in relation to the pattern blade 38' and the specimen blade 42 which are shown to be relatively small and short. It will be noted that any of the transducers can be clamped to the head of the tracing lever by which it is carried with the disc thereon disposed either above or below the tracing lever. This is true also of the pivotal supporting staff 33 of each of the follower discs 36.

Among numerous other modifications of the exact kinds and arrangements of parts herein illustrated and described is the alternative of locating either one of the table axes 14 or 15 between axis 10 and the other of said table axes when testing a work piece 42 that is proportionally smaller in profile contour than is pattern 38. Registering instruments may be substituted for a recording instrument and the servo system of FIG. 12 may take any of well known forms.

The appended claims are directed to and intended to cover all variations that come within a broad interpretation of the terms employed to define the invention.

What is claimed is:

1. Testing apparatus for detecting and measuring variance in configuration between the contour of a specimen work piece surface and the corresponding curve of a master pattern comprising, a first rotary support adapted to have a pattern curve fixed thereon in a manner to revolve in unison with said first rotary support about a reference axis, a second rotary support adapted to have a specimen work piece fixed thereon in a manner to revolve in unison with said second rotary support about a different axis spaced from and parallel with said reference axis, means to rotate said supports simultaneously in synchronism about said axes respectively, a carrier pivotally mounted to oscillate about a third axis spaced from and parallel with both said reference axis and said different axis, stations on said carrier in operative proximity respectively to the surface of said specimen work piece and to the curve of said pattern, a follower mounted on said carrier projecting from one of said stations toward the said reference axis, means to swing said carrier toward said reference axis to positions maintaining said follower coincidental with said pattern curve while the latter revolves with said first rotary support, a work piece sensing feeler projecting tiltably from the other of said stations toward said difference axis and mounted on said carrier in a manner to be displaceable from a position of neutral tilt relative to said carrier to various angles of tilt relative thereto, means yieldably biasing said feeler to tilt relatively to said carrier toward said different axis to positions for constantly bearing against the surface of said specimen work piece while the latter revolves with its said rotary support, and means to detect and measure the extent of tilting of said feeler from said position of neutral tilt on said carrier resulting from divergence of the surface contour of said specimen work piece from conformity to the configuration of said pattern curve.

2. Testing apparatus as defined in claim 1, in which the said feeler comprises, an elongate casing, containing an axially receprocative core having a tip operably located outside of one end of said casing, a pivotal support for said casing on said carrier enabling said casing to tilt thereupon, an article sensing feeler carried on an end of said casing remote from said core tip, and an abutment on said carrier presenting an inclined surface in the path of lateral swinging of said core tip about said pivotal support, whereby said core tip encounters said inclined surface in a manner to cause movement of said core axially of said casing when the latter tilts about said pivotal support.

3. A mechanism as defined in claim 2, in which the said core tip includes an antifrictional ball positioned to contact and roll against the said inclined abutment surface.

4. A mechanism as defined in claim 2, together with means to adjust and station the said abutment in selective proximity to the said pivotal support of the core casing.

5. A mechanism as defined in claim 2, together with electric field windings within the said core casing, and electrical conductors for energizing said field windings entering the end of said casing which carries the said article sensing feeler.

6. A mechanism as defined in claim 2, in which the said abutment has a recess forming the said inclined surface, together with a spring reactive between the said transducer casing and the said core yieldably urging the latter to seat in said recess.

7. In a method of comparing an unlimited part of the entire uniplanar profile contour of a specimen article with that of a master article, the improvement which comprises the steps of, simultaneously tracing serially related components of the entire uniplanar profile contour of said master article, simultaneously describing in space separate paths having configurations respectively like that of said serially related components, subjecting serially related uniplanar components of the profile contour of a specimen article to comparison with the configuration of said separate paths, and simultaneously making separate records of the discrepancies between the uniplanar profile contour components of the specimen article and the uniplanar profile contour components of the master article respectively, whereby a comparison of the entire profile contours of both articles can be made within the time required to trace only a component of said contours.

8. The method defined in claim 7, in which the said serial components of the entire profile contour of the said master article and of the said specimen article comprise broadside faces and intervening edges of a blade-shaped article, one of which broadside faces is convex and the other of which faces is concave.

9. The method defined in claim 7, in which the said master article contour is traced simultaneously by traveling contact with two oscillatable followers and the said specimen article contour is sensed simultaneously by traveling contact with two oscillatable feelers, each of said followers contacting simultaneously with respectively different serially related components of the entire profile contour of said master article.

10. The method defined in claim 9, in which both of the said feelers are in trailing contact simultaneously with respectively different serially related components of the entire profile contour of said specimen article.

11. In testing apparatus for detecting and measuring variance in configuration between the uniplanar contour of a specimen article surface and the uniplanar contour of a master article surface wherein said surfaces are traced by means of a follower and a feeler respectively and simultaneously while said surfaces are turned progressively in synchronism about spaced apart parallel axes, the improvement which comprises the combination of a master article mounted for revolution about a first axis while tracing the peripheral contour thereof, means to support and revolve a specimen article about a second axis spaced from and parallel with said first axis, two carriers movable relatively and independently in the neighborhood of said articles, two followers mounted respectively on said carriers in positons to be urged thereby in diverse directions in a common plane toward and into tracing contact with respectively different serial components of the periphery of said master article, two feelers mounted respectively on said carriers in positions to be urged simultaneously thereby in diverse directions in a common plane toward and into tracing contact with respectively different serial components of the periphery of said specimen article, and recording means operably responsive to simultaneous movements of said followers and of said feelers in a manner to make a unified and comparable record of said movements thereof.

12. In testing apparatus for the purpose stated in claim 11, the combination defined in said claim in which the said carriers are pivotally mounted to oscillate about a common third axis stationed between the said first and second axes of article rotation and in uniplanar alignment therewith.

13. In testing apparatus for the purpose stated in claim 11, the combination defined in said claim in which the said recording means includes a strip of chart paper, a plurality of graph generating styli arranged to mark simultaneously thereon, and means operatively associating said styli with the said specimen article sensing feelers respectively, whereby said styli mark separate graphs simultaneously on the same chart paper and make a unified comparable record of said feeler movements.

References Cited by the Examiner

UNITED STATES PATENTS

| | | | |
|---|---|---|---|
| 1,652,435 | 12/1927 | Goodrich | 33—179.56 |
| 2,433,421 | 1/1947 | Browness | 33—179.56 |
| 2,623,293 | 12/1952 | Nebesar et al. | 33—179.56 |
| 2,640,272 | 6/1953 | Bean | 33—174 |
| 2,686,370 | 8/1954 | Walker et al. | 33—174 |
| 2,753,764 | 7/1956 | Stephenson | 33—174 |
| 2,833,046 | 5/1958 | Jeglum | 33—169 |
| 2,855,689 | 10/1958 | Campbell | 33—174 |
| 2,883,905 | 4/1959 | Crook | 33—174 |
| 3,193,937 | 7/1965 | Aller | 33—169 |

LEONARD FORMAN, *Primary Examiner.*

S. S. MATTHEWS, *Assistant Examiner.*